United States Patent Office.

OSCAR A. WAGNER, OF DAVENPORT, IOWA.

Letters Patent No. 77,420, dated April 28, 1868.

IMPROVED ARTIFICIAL-SLATE SURFACE.

*The Schedule referred to in these Letters Patent and making part of the same.*

TO ALL WHOM IT MAY CONCERN:

Be it known that I, OSCAR A. WAGNER, of Davenport, in the county of Scott, and State of Iowa, have invented a new and useful Improved Process for Manufacturing an Artificial Metallic Imitation of Slate; and I do hereby declare that the following is a full, clear, and exact description of the same.

Take ninety-eight per cent. alcohol, and add as much gum-shellac as the alcohol will cut. Of this mixture take fifty parts, add thereto, of drop-black, five parts, of pulverized pumice-stone, twenty-five parts, and twenty parts of iron-filings.

Incorporate the mixture by grinding thoroughly in a paint-mill, and apply with a flat paint-brush to any suitably-prepared surface. When dry, the surface will be coated with a hard enamelled surface, resembling slate in appearance.

If, when applied, the composition presents too glossy an appearance, use more alcohol and less shellac, and if the composition has a tendency to rub off, use more shellac and less alcohol.

What I claim as my invention, and desire to secure by Letters Patent, is—

A composition of matter for forming an imitation of the surface of slate, compounded from the ingredients named, substantially in the manner set forth.

OSCAR A. WAGNER.

Witnesses:
JULIUS SCHUTT,
AARON CHANDLER.